Feb. 3, 1959  H. BRANDT  2,871,665
SEISMIC CABLE LIFTING APPARATUS
Filed Oct. 20, 1955  2 Sheets-Sheet 1

INVENTOR
HARRY BRANDT
BY
ATTORNEYS

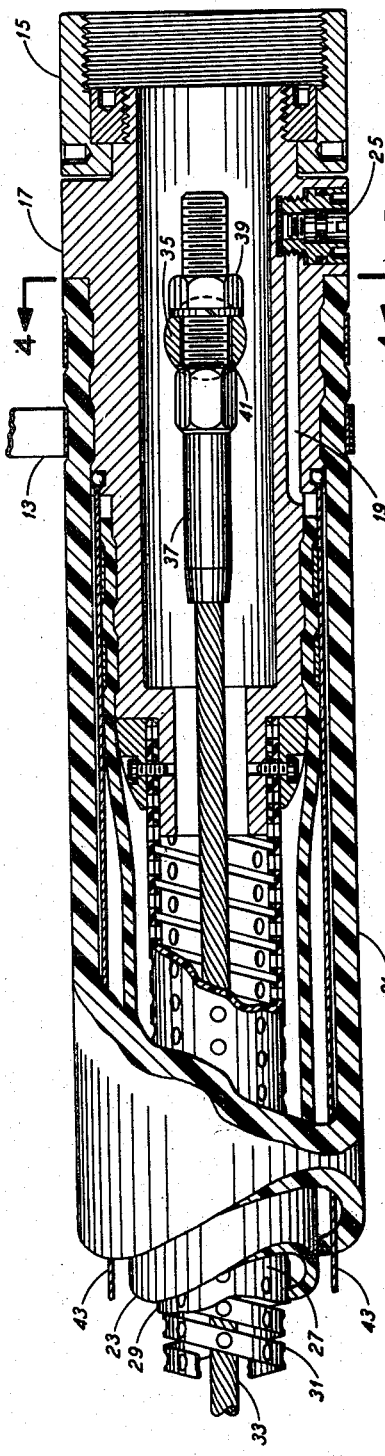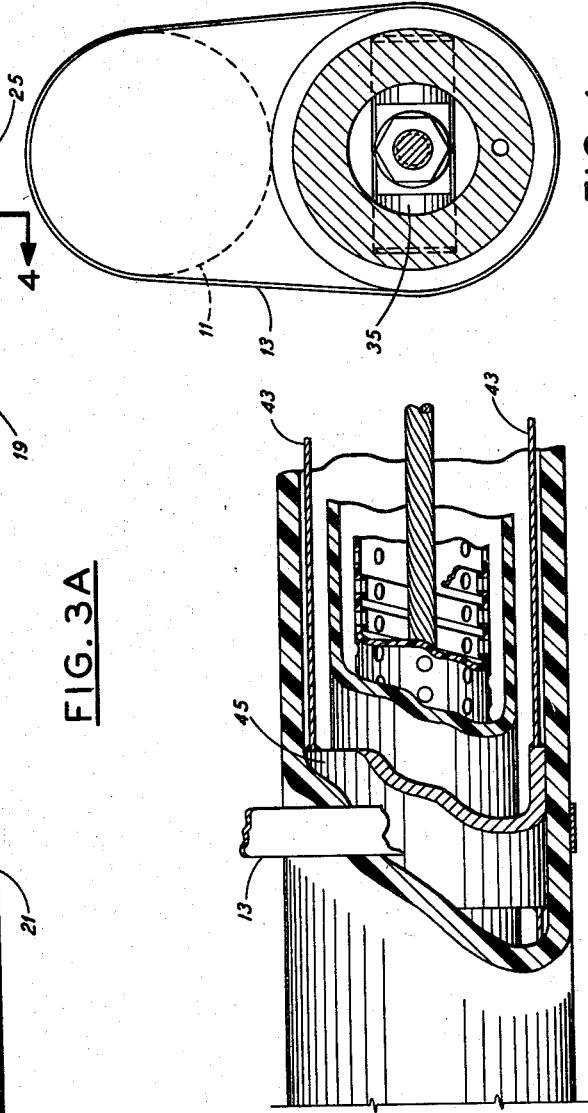

United States Patent Office 2,871,665
Patented Feb. 3, 1959

2,871,665

SEISMIC CABLE LIFTING APPARATUS

Harry Brandt, Whittier, Calif., assignor to California Research Corporation, San Francisco, Calif., a corporation of Delaware Application October 20, 1955, Serial No. 541,715

1 Claim. (Cl. 61—72)

My invention relates to apparatus for raising and lowering an offshore seismic cable and particularly to an auxiliary cable the specific weight of which is varied from greater than that of water to less than that of water to control its position in the water.

According to the prior art of which I am aware, offshore seismic exploration has been performed through the use of seismic detector cables which are either laid on the bottom of the ocean or are floated in the water at or near the surface. A floating cable is found to be convenient to use in some operations. Such a cable however, may be lacking in sensitivity if, for example, the seismic detectors in the cable are of the pressure sensitive type.

I have found that in some areas where the water is shallow, it is desirable that the seismic detectors be placed as low in the water as possible, specifically, on the bottom of the ocean. If the seismic cable is laid on the bottom, the operator ordinarily moves the cable for successive seismic shots by dragging the cable along the bottom. Such dragging of the cable causes abrasion of its outer surfaces and at times damages the cable elements. The problem of damage to the cable is particularly severe in areas of coral or rock bottoms. The sharp coral tends to snag the cable and cause appreciable delay and consequent expense.

To solve these problems, I have provided an auxiliary cable by which a seismic cable may be lowered to the bottom or floated to the surface at the will of the operator. Such an arrangement permits the cable to record the seismic waves from a position on the bottom, then to be raised in the water before it is moved to another location. Thus, the cable affords the benefits of recording the seismic energy at the bottom and avoids the damage to the cable which would result from dragging it along the bottom as it is moved to a new location.

In addition, a cable according to my invention fails safe. If the auxiliary cable is punctured or severed at any point, the undamaged sections of the cable become buoyant and tend to lift the entire cable toward the surface. Thus severe damage to the cable does not result in loss of the cable.

Briefly stated, I employ a neutrally buoyant seismic detector cable. An auxiliary cable is attached to the neutrally buoyant cable along its entire length. The auxiliary cable contains two chambers one of which is expandable and is filled with a compressible gas. A pump on the recording boat forces a relatively incompressible fluid into the cable compressing the expandable chamber and the gas contained therein, increasing the specific weight of the auxiliary cable and forcing it to sink to the bottom together with the neutrally buoyant cable. To raise the auxiliary cable and, together with it, the neutrally buoyant cable, the relatively incompressible fluid is allowed to flow out of the auxiliary cable into a storage tank on the recording boat under the pressure exerted by the compressible gas within the expandable chamber.

The novel features of my invention are set forth with more particularity in the accompanying claim. The invention itself, however, with respect to the details thereof, together with its additional objects and advantages, may be better understood from the following description of a specific embodiment with reference to the accompanying drawings in which:

Figs. 3A and 3B show a cutaway section of an auxiliary cable according to my invention; and Fig. 4 shows a sectional view through an auxiliary cable.

Figure 1:
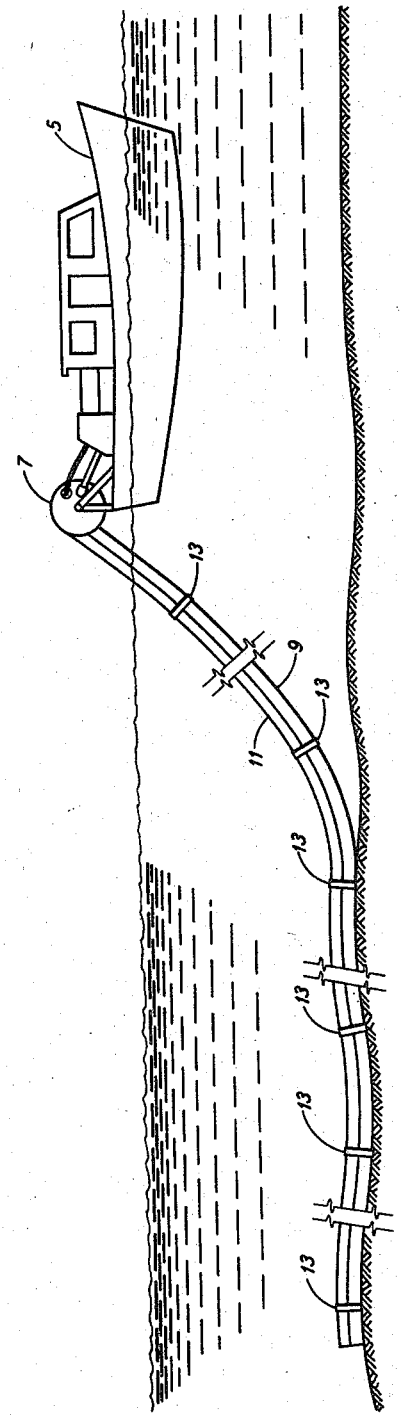
Fig. 1 shows schematically seismic cables according to my invention in position for use.
Figure 2:
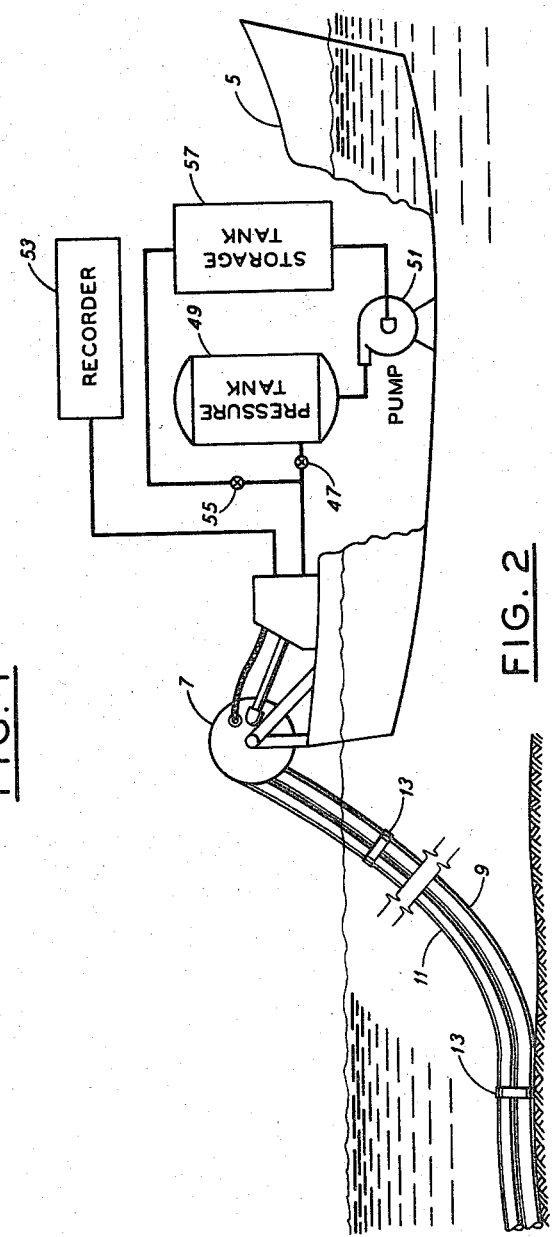
Fig. 2 shows schematically the pumps and associated equipment for controlling the density of the auxiliary cable.

As shown in Fig. 1, a recording boat 5 has a reel 7 over which an auxiliary cable 9 and a neutrally buoyant cable 11 are reeled out into the water. Straps 13 are placed around the two cables at intervals to bind the neutrally buoyant cable 11 to the auxiliary cable 9 along their entire length.

The live sections of the seismic cable are adapted to lie on the bottom, if desired, but a portion of the seismic cable at one end is of sufficient length to extend out of the water to the recording boat 5. This portion of the seismic cable contains wire cables which act as strength members to permit the cable to withstand longitudinal stress and electrical conductors which transmit signals from the detectors in the live section to the recorder on the boat 5.

The details of the auxiliary cable are shown in Figs. 3A, 3B and 4. In Fig. 3A is shown a female coupling 15 which is adapted to screw onto a corresponding male coupling which is not shown. This coupling provides sufficient strength to pull successive sections of the seismic cable through the water in response to a longitudinal force exerted from the recording boat. The sections of the auxiliary cable may be 50 feet in length and a number of sections of the cable are joined together by said male and female couplings in order that it have the same length as the neutrally buoyant cable to which it is affixed by the bands 13. There is an opening through the coupling 15 through which liquid may flow unobstructed. The end section 17, which is similar for the male and female ends of the cable section has a passageway 19 leading into an expandable chamber between the heavy durable cover fabric 21 and a flexible inner sleeve 23. The passageway 19 is closed by a screw plug 25. The screw plug 25 may be removed and gas pumped through the passageway 19 into an expandable chamber between the cover 21 and flexible inner sleeve 23. The pressure of this gas is sufficient to force the flexible sleeve 23 against the rigid conduit 27 which lies at the center of the cable. The conduit 27 is crush-resistant and resistive to radial pressures but is flexible to bending pressures. Thus, the auxiliary cable may be flexed and the conduit 27 bends with it. It does not, however, contract or collapse under the radial pressure from the gas entrapped between the members 21 and 23. The specific conduit shown in Fig. 3A has a soft outer coating 29 and a flexible metal cylinder 31 as integral parts of it. Alternatively, the conduit 27 could be a spring which has its coils lying close together, or it could be made of flexible stainless steel pipe or other materials which permit flexure of the conduit but render it resistive to radial pressure. Through the center of the auxiliary cable passes a strength member 33, preferably constructed of stranded steel. As shown in Fig. 4, the end member 17 has a hole formed transversely through it through which passes a steel dowel 35 to which the strength member 33 is attached. The end fixture 37 on the strength member 33 passes through the dowel 35 and is secured to the dowel 35 by the shoulder 41 and nut 39. Small cables 43 are attached between the female end of the cable and the male end of the cable (not shown). At a number of points along the auxiliary cable are placed bands 45 which lie against the inner surface of the covering 21 under the bands 13. The bands 13 are placed under tension around the auxiliary cable 9 and the neutrally buoyant cable 11 to attach the cables together. The bands 45 prevent the auxiliary cable from compressing under the force exerted by the bands 13. The outer covering 21 may be made of nylon pregnated neoprene or other wear-resistant and watertight material. The inner sleeve 23 may be made of rubber or other fluidtight material. It need not be resilient although it comprises the moving wall of an expandable chamber. As the chamber between the members 21 and 23 contracts under pressure within the cable, the inner sleeve 23 may fold.

In preparing the auxiliary cable 9 for use, the screw plug 25 is removed and air or another compressible gas is forced into the expandable chamber between members 21 and 23. The screw plug 25 is then replaced. The sections of the auxiliary cable are screwed together and attached by the bands 13 to a neutrally buoyant cable 11. A hydraulic line leads from the auxiliary cable 9 through a valve 47 to a pressure tank 49. Initially, the center chamber within the sections 17 and conduit 27 contain a residual quantity of a relatively incompressible fluid such as water or oil. The expandable chamber between the members 21 and 23 is under air pressure so that the sleeve 23 lies in contact with the conduit 27. At this time the auxiliary cable 9 is buoyant. Since the cable 11 has neutral buoyancy, the cables 9 and 11 float at the surface of the water. The valve 55 leading to the storage tank 57 is closed. The pump 51 is placed in operation to force fluid into the pressure tank 49. A compressible gas is trapped in the upper portion of the pressure tank 49. The valve 47 connecting the pressure tank 49 to the auxiliary cable 9 is opened permitting the fluid to flow from the pressure tank into the center portion of the auxiliary cable 9, the pump 51 supplying an additional quantity of fluid to the pressure tank 49. After a sufficient quantity of fluid is thus forced from the pressure tank into the cable 9, the specific weight of the auxiliary cable 9 is increased until its specific weight is greater than the specific weight of the sea water. The cables 9 and 11 then sink to the bottom of the water. The valve 47 is closed when sufficient fluid has been forced into the cable 9 to cause the cables 9 and 11 to sink. A charge of explosive is detonated, sending seismic waves into the bottom to be reflected from subterranean strata and detected by the detectors which are spaced within the neutrally buoyant cable 11 and recorded on the recorder 53. It is then necessary to move the cables to another location for another seismic recording.

Now the valve 55 is opened, and valve 47 remains closed permitting a quantity of fluid within the auxiliary cable 9 to flow under the influence of the pressure of the gas in the expandable chamber into the storage tank 57. The storage tank 57 may be open at the top or it may be enclosed and maintained at atmospheric pressure or less. As a quantity of fluid flows out of the auxiliary cable 9 into the storage tank 57, the specific weight of cable 9 decreases and cables 9 and 11 then rise to the surface. The recording boat 5 is then moved to another location at which valve 55 is closed, valve 47 is opened and a quantity of fluid is forced back into the auxiliary cable 9 causing cables 9 and 11 to sink to the bottom.

Thus it is seen that I have provided a means for raising and lowering a seismic cable without the introduction of bulky equipment which is attached to the cable. The energy required to operate the cable is transmitted by the fluid acted on by the pump on the recording boat. Energy is required to compress the gas trapped between the sleeve 23, and the outer cover 21 of the auxiliary cable. The energy thus stored in the gas is released as the fluid is expelled from the cable thus causing the cable to rise to the surface. I have found that 50 foot sections of cable can be designed so that the cable, together with the amount of fluid which cannot be expelled by the gas pressure in the expandable chamber, has a positive buoyancy of 20 pounds per 50 foot section. Sufficient fluid can be forced into the cable to give it a negative buoyancy of 20 pounds per 50 foot section. The outer covering 21 is relatively inelastic and the volume of the cable does not change appreciably as a result of the change in the internal pressure of the cable.

An important advantage of my cable lies in the fact that portions of it rise to the surface in the event that both its outer coverings 21 and its inner sleeve 23 are ruptured. When the cable contains sufficient fluid to cause it to sink, the gas pressure in the expandable chamber is greater than the water pressure around the cable. In the event that the covering 21 and the sleeve 23 are ruptured in one section, fluid flows out of the cable from all of the sections of the cable, forced by gas pressure in the expandable chambers of these other sections. The damaged section has negative buoyancy but the other sections of the cable have sufficient positive buoyancy to cause these sections of the cables 9 and 11 to rise to the surface. This affords a fail-safe feature in that damage to one section of the cable or a complete breaking apart of the cable at one point causes the undamaged cable sections to float to the surface, thus saving valuable equipment.

While I have described this invention with reference to a specific embodiment thereof, I am aware that many modifications of it can be made without departing from the scope of my invention. I do not intend, therefore, to be limited except as set forth in the appended claim.

I claim:

Apparatus for controlling the vertical location of a horizontal seismic detector cable in a body of water comprising a flexible elongated float means of controllable buoyancy attached to and parallel with the seismic cable, gas chambers in said float means, said gas chambers separately sealed and horizontally displaced from each other along the length of said float means, means to introduce a gas separately into each of said chambers, a flexible wall in each of said chambers and disposed interiorly of said float means, a flexible conduit disposed interiorly of said float means to form a passage for a liquid longitudinally therethrough, perforations formed through the walls of said conduit to provide access for said liquid to the interior of said float means throughout its length to exert liquid pressure on the said flexible wall of each of said chambers, and means to introduce a liquid under pressure into said conduit and to release said liquid from said conduit to control the buoyancy of said float means.

References Cited in the file of this patent

UNITED STATES PATENTS

| 2,050,888 | Kirch | Aug. 11, 1936 |
| 2,391,059 | McFarren | Dec. 18, 1945 |
| 2,609,001 | Hebard | Sept. 2, 1952 |
| 2,668,512 | Klas | Feb. 9, 1954 |

FOREIGN PATENTS

| 1,270 | Great Britain | 1857 |
| 118,293 | Australia | 1944 |
| 617,699 | Great Britain | Feb. 10, 1949 |
| 1,049,909 | France | Oct. 26, 1953 |